United States Patent [19]
Achelpohl et al.

[11] Patent Number: 5,288,284
[45] Date of Patent: Feb. 22, 1994

[54] METHOD FOR MAKING BAGS AND AN APPARATUS FOR CARRYING OUT THIS METHOD

[75] Inventors: Fritz Achelpohl; Friedhelm Mundus, both of Lengerich; Hans-Ludwig Voss, Tecklenburg, all of Fed. Rep. of Germany

[73] Assignee: Windmoeller & Hoelscher, Lengerich, Fed. Rep. of Germany

[21] Appl. No.: 989,866

[22] Filed: Dec. 14, 1992

[30] Foreign Application Priority Data

Dec. 16, 1991 [DE] Fed. Rep. of Germany ....... 4141466

[51] Int. Cl.⁵ .......................... B31B 1/84; B31B 1/86
[52] U.S. Cl. ...................................... 493/221; 493/226
[58] Field of Search ............... 493/221, 226, 926, 195, 493/196, 344, 393

[56] References Cited

U.S. PATENT DOCUMENTS

| 3,523,686 | 8/1970 | Cawley . | |
|---|---|---|---|
| 3,865,018 | 2/1975 | Gaffney | 493/926 |
| 4,292,033 | 9/1981 | Wolske | 493/221 |
| 4,889,253 | 12/1989 | Sengewald | 493/926 |
| 4,988,213 | 1/1991 | Mattle | 493/226 |

FOREIGN PATENT DOCUMENTS

| 0347522 | 12/1989 | European Pat. Off. . | |
|---|---|---|---|
| 1414457 | 11/1975 | United Kingdom | 493/226 |

Primary Examiner—Jack Lavinder
Attorney, Agent, or Firm—Keck, Mahin & Cate

[57] ABSTRACT

The invention relates to a method for making bags preferably provided with side folds or other flat workpieces, which have a slip extending beyond their boundary. In accordance with the invention partly prefabricated bags are laterally supplied to a conveyor belt driven in a timed manner, and are seized there by grippers and fixed. By means of a glue applicator a glue strip is applied to the bag in its bottom region during the timed feeding movement of the conveyor belt. Finally, in a slip application station a slip is supplied each laterally to the conveyor belt and is placed onto the glue surface. The invention furthermore relates to an apparatus for carrying out the aforementioned method.

8 Claims, 2 Drawing Sheets

METHOD FOR MAKING BAGS AND AN APPARATUS FOR CARRYING OUT THIS METHOD

FIELD OF THE INVENTION

The invention relates to a method for making bags preferably provided with side folds or other flat workpieces, which have a slip extending beyond their boundary.

BACKGROUND OF THE INVENTION

Such bags are known in principle from the European Patent Application 347 522. The packaging bags of tubular film cut into lengths, which have already been described there, are open at one end for filling purposes. In the vicinity of the open end a possibly removable slip or a film tag is disposed, which is connected with a flat side of the bag in the vicinity of the open end of the bag. The slip or tag has two stacking holes for stacking the bag on stacking pins of a stacking station.

SUMMARY OF THE INVENTION

It is the object of the present invention to provide a method for making the aforementioned bags and an apparatus for carrying out this method.

In accordance with the invention a method for making the above-described bags comprises the following steps:

a) partly prefabricated bags are laterally supplied to a conveyor belt driven in a timed manner and are seized there by grippers and fixed, b) by means of a glue applicator a strip of glue is applied onto the bag in its bottom region during the timed feed movement of the conveyor belt, c) in a slip application station one slip each is supplied laterally to the conveyor belt and is placed onto the glue surface.

In accordance with the invention, the prefabricated bags as well as the individual slips are supplied from the side to the conveyor belt, whose transport direction accordingly is transverse to the feeding direction of the bags or slips.

It is particularly advantageous that the supplied slips are dry. As a result, the parts of the apparatus by means of which the slips are separated from a web or are placed onto the bag, are not smeared with glue. This risk exists, for instance, in the apparatus for gluing reinforcement slips to the inside of the rims of a half tubular film for making bags. In accordance with the teaching described there, the corresponding reinforcing film web is coated with adhesive by means of an adhesive applicator before it is applied onto the half tubular web. In accordance with the teaching of the present invention the adhesive or glue is instead applied through a glue nozzle serving as glue applicator directly onto the outside of a bag in the bottom region during the timed feed movement of the conveyor belt.

In the slip application station the slips can be formed by cutting a web pulled off from a roller, where the longer sides of the slips each form the cutting line. Due to the fact that the slips are separated from the roller in transverse direction, a large number of slips can be wound onto a roller. On the other hand, it has so far not been common practice to wind up the web in its longitudinal direction for forming slips, so that corresponding slips were cut along their narrower sides. This arrangement led to narrow rollers with a very large diameter, which have, however, certain disadvantages over the rollers now provided in accordance with the invention, in particular with respect to the required space.

By means of a hole punching machine stacking holes can be punched into the web, before the web is cut for forming the slips.

A particularly advantageous embodiment of the invention consists in that the bags provided with the slips are delivered below the discharge end of the conveyor belt to a conveyor belt provided with stacking pins.

A stacking station for bags provided with receiving holes is already known, for instance, from the U.S. Pat. No. 3,523,686. Bags unilaterally provided with stacking holes are delivered to a conveyor belt, which seizes the same by corresponding grippers. After reversing the bags, their free end is sucked in and pulled taut by a suction cylinder. By correspondingly reversing the conveyor belt the bag is then placed on corresponding stacking pins of a coiler by means of its stacking holes. This stacking station has a comparatively complicated design. On the other hand, in accordance with the preferred embodiment of the present invention the bag provided with the protruding slip is transported further on the transport belt and turned round via the discharge end. The slips protruding from the side of the transport belt, into which the stacking holes are punched, can then be placed onto the stacking pins arranged offset from each other beside the conveyor belt. Said stacking pins can likewise be brought to their receiving position by means of a conveyor belt movable in a timed manner.

An inventive apparatus for carrying out the aforementioned method comprises a conveyor belt that can be driven in a timed manner for receiving the partly prefabricated bags by means of grippers arranged thereon. On one side of said conveyor belt a feeding station, a glue application station and a slip application station are disposed one behind the other in conveying direction of the conveyor belt. The slip application station has a distance from the feeding station for the partly prefabricated bags, which approximately corresponds to a feed length of the conveyor belt.

Below the conveyor belt a further intermittently drivable conveyor belt with stacking pins can be arranged such that the finished bags, after having turned round the discharge end of the conveyor belt, can be placed onto the same in a desired stacking height.

The slip application station advantageously has a suction cylinder with individual segments to which suction air can be applied, enclosing a gap therebetween in which a cutting knife can move in a timed manner.

Furthermore, below the carrying run of the conveyor belt a lifting member can be disposed for attaching the slips in a timed manner.

Further details and advantages of the present invention follow from the ensuing discussion of a preferred embodiment, which is illustrated in the drawing, wherein:

DETAILED DESCRIPTION OF THE PREFERRED EMBODIMENTS

Figure 1:
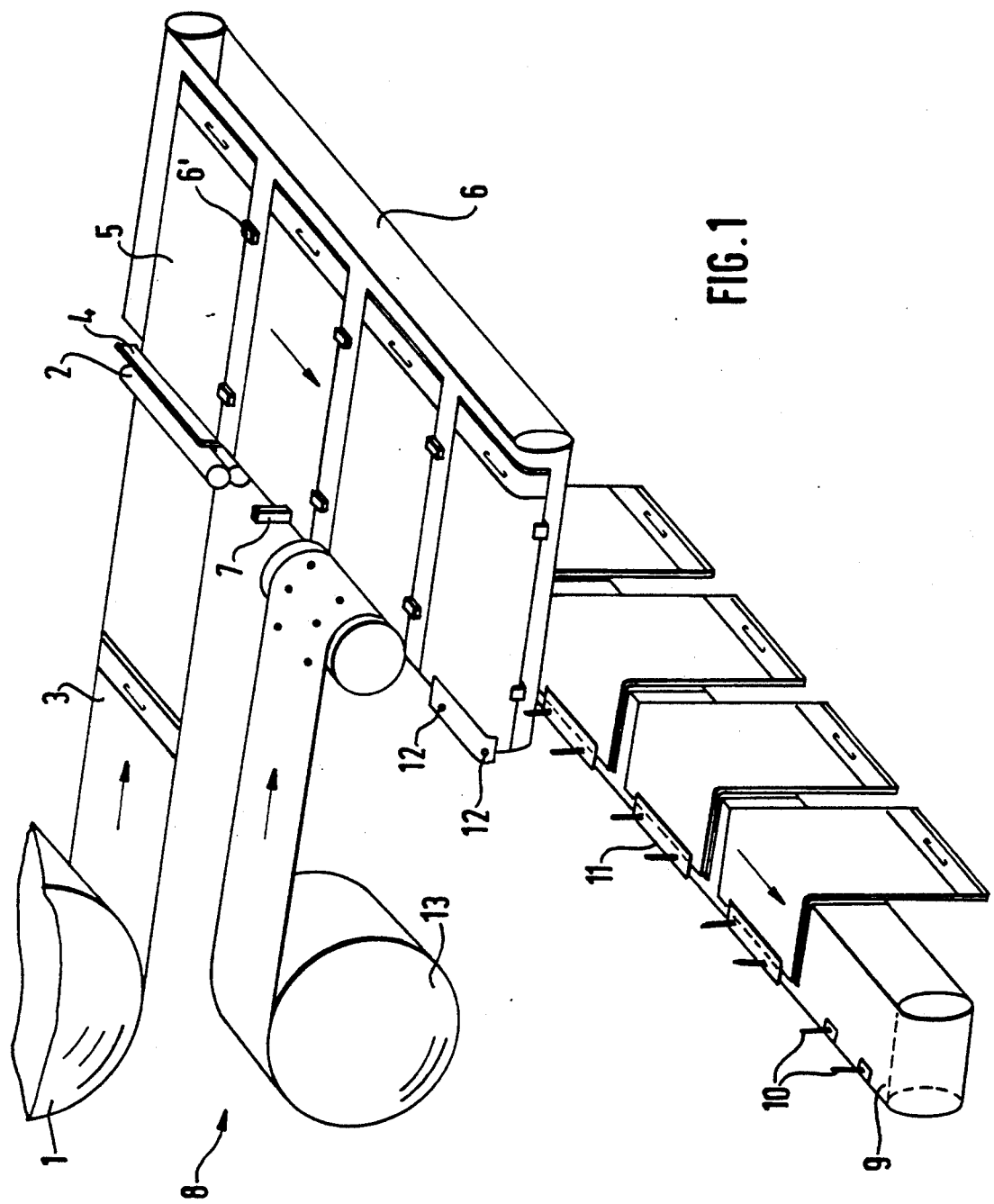
FIG. 1 shows an inventive apparatus in a perspective view.

In FIG. 1 reference numeral 1 designates a roller on which a prefabricated chain of bags provided with side folds is wound up. By means of advancing rollers 2 a prefabricated bag is pulled off from this roller, which bag is separated from the bag chain 3 by means of knives 4. The cut off bag 5, which is open at its bottom end, has been pushed onto a conveyor belt 6 from the side and gripped by grippers (6'). Then, the conveyor belt 6 is advanced by one cycle, so that the cut off bag is in the vicinity of the glue nozzle 7. During a further cycle, in which a bag is again pulled off from the roller 1 and is placed onto the conveyor belt 6, the previously cut off bag gets in the vicinity of a slip application station 8. On its way to this station a short strip of glue is applied via the glue nozzle 7 onto an outside of the bag 5 in the region of its bottom end. At the discharge end of the conveyor belt 6 below the same a further conveyor belt 9 is provided, which is provided with pairs of stacking pins 10. On said pins 10 individual bags 5 are collected to form a stack of a certain height, with the pins 10 protruding through the stacking holes 12 provided in the slips 11.

Figure 2:
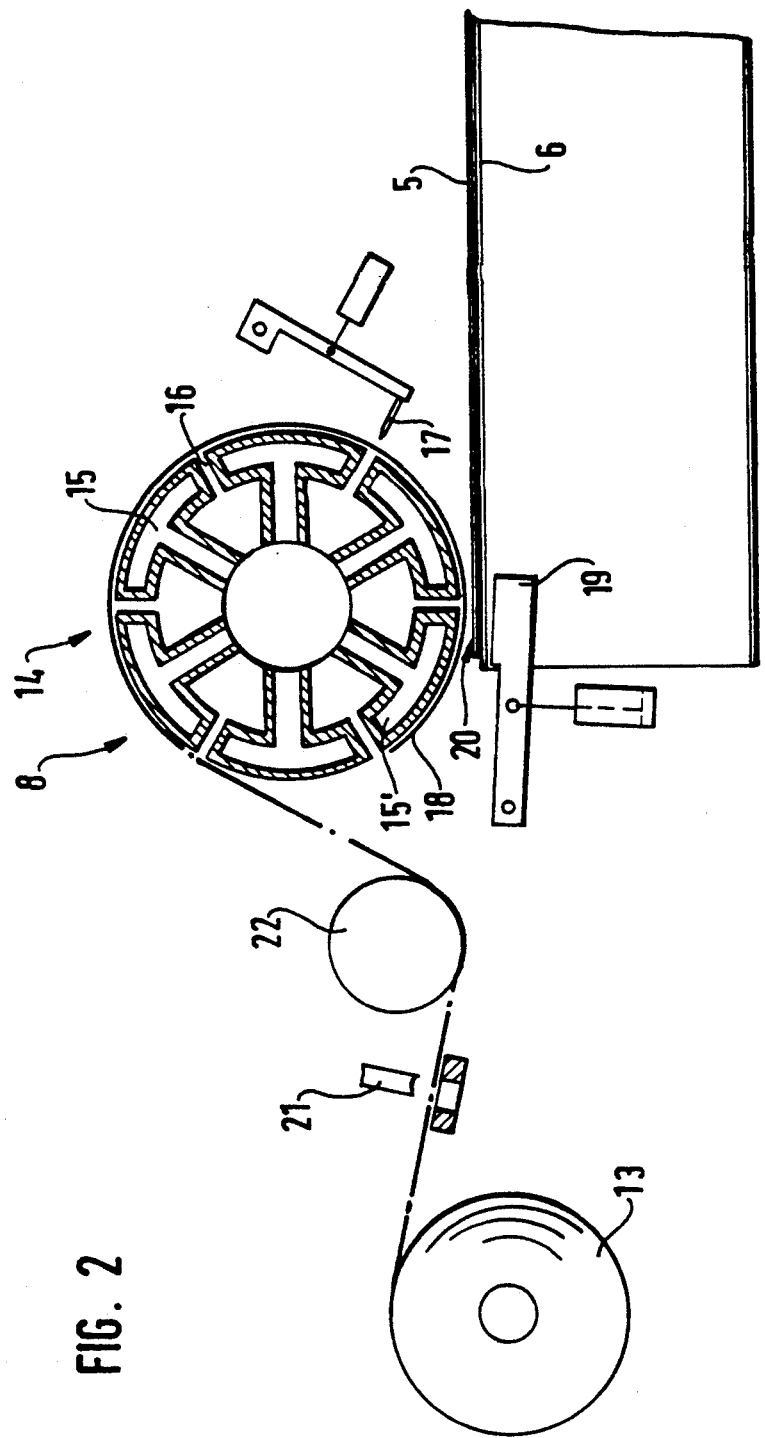
FIG. 2 shows a part of the apparatus represented in FIG. 1 in an enlarged and detailed representation.

The slip application station itself is illustrated in detail in FIG. 2. In this Figure a further flat web roller 13 arranged axially parallel with respect to the roller 1 is shown, where from said flat web roller via a suction cylinder 14 individual slips are pulled off in a clocked manner. The suction cylinder 14 is constituted by individual segments 15 to which suction air can be applied, which enclose a small gap 16 therebetween. Into said gap a knife 17 moves in a timed manner, so that from the suction cylinder 14 individual slips 18 can be separated, which correspond to the arc length of the segments 15.

In FIG. 2 the situation is shown in which a slip 18 is still held by the segment 15'. By means of a lifting member 19 disposed below the carrying run of the conveyor belt 6, the conveyor belt 6 is briefly lifted at this point, so that the slip 18 is attached at the bottom end of the bag 5 by means of the glue strip 20. In the moment of the lowering movement of the lifting segment 19 the air in the segment 15' must of course also be reversed, so that the slip 18' is released from the suction cylinder 14.

In FIG. 2 there is furthermore schematically represented a hole punching machine 21, by means of which the flat web is provided with stacking holes, whereafter the web is supplied to the actual suction cylinder 14 via a reversing roller 22.

What is claimed is:

1. A method for making bags or other flat workpieces, which have a slip extending beyond their boundary, characterized by the following steps:
   a) supplying partly prefabricated bags (5) laterally to a conveyor belt (6) driven in a timed manner,
   b) gripping said bags with grippers (6') located on the conveyor belt,
   c) applying a strip of glue via a glue applicator (7) to provide a glue surface on each bag (5) in a bottom region thereof, while the conveyor belt (6) is advanced in a timed manner,
   d) in a slip application station (8), supplying a slip (18) laterally to each region on the conveyor belt (6) and placing said slip onto the glue surface thereof.

2. The method according to claim 1, characterized in that the slips (18) are formed in the slip application station (8) by cutting a web pulled off from a roller (13), where the cutting lines each form the longer sides of the slips (18).

3. The method according to claim 2, characterized in that by means of a hole punching machine (21) stacking holes (12) are punched before the web is cut for forming the slips (18).

4. The method according to claim 1, characterized in that the bags (5) provided with the slips (18) are delivered to a conveyor belt (9) which below a discharge end of the conveyor belt (6) and is provided with stacking pins (10).

5. An apparatus for carrying out a method for making bags optionally provided with side folds or other flat workpieces, which have a slip extending beyond a boundary edge, characterized by:
   a conveyor belt (6), which can be driven in a timed manner, for laterally receiving the partly prefabricated bags (5) via grippers (6') arranged thereon
   a supplying station for the partly prefabricated bags (5) located adjacent the conveyor belt, a glue applicator (7) arranged following the supplying station in a conveying direction of the conveyor belt (6) for applying a strip of glue on each bag in a bottom region thereof, and a slip application station (8) following the glue applicator, which is arranged at a distance from the supplying station, which approximately corresponds to a feed length of the conveyor belt (6) for applying a slip laterally to each bag on the conveyor belt and placing said slip onto the strip of glue on each said bag.

6. The apparatus in accordance with claim 5, characterized in that below the conveyor belt (6) a further intermittently drivable conveyor belt (9) with stacking pins (10) is arranged such that after the bags have been turned round the discharge end of the conveyor belt (6) the finished bags can be placed onto the belt (9) in a desired stacking height.

7. The apparatus in accordance with claim 6, characterized in that the slip application station (8) comprises a suction cylinder (14) with individual segments (15) to which suction air can be applied, enclosing therebetween a gap (16) into which a cutting knife (17) can move in a timed manner.

8. The apparatus in accordance with claim 5, characterized in that below the carrying run of the conveyor belt (6) a lifting member (19) is disposed for attaching a slip (18) in a timed manner.

* * * * *